United States Patent [19]

Hiraiwa

[11] Patent Number: 5,518,465
[45] Date of Patent: May 21, 1996

[54] PLANETARY GEARTRAIN

[76] Inventor: Kazuyoshi Hiraiwa, 6-5-8, Tomioka-nishi, Kanazawa-ku Yokohama, Japan

[21] Appl. No.: 338,387

[22] Filed: Nov. 14, 1994

[51] Int. Cl.$^6$ .................................................. F16H 3/62
[52] U.S. Cl. .................................................. 475/275
[58] Field of Search ................................ 475/169, 275

[56] References Cited

U.S. PATENT DOCUMENTS

| 5,295,924 | 3/1994 | Beim | 475/275 |
| 5,308,295 | 5/1994 | Michioka et al. | 475/275 |
| 5,435,792 | 7/1995 | Justice et al. | 475/275 |

Primary Examiner—Dirk Wright

[57] ABSTRACT

In a planetary geartrain for automotive transmissions, this invention improves a fuel economy by reducing drag resistance caused from non-operating friction elements in the high speed cruising.

In the planetary geartrain composed of planetary gear sets and friction elements, this invention enables a A member fixed to a case in the forward first and the reverse position to be connected selectively to the case or an input shaft through series of a multiplate clutch assembly and a dog clutch.

4 Claims, 2 Drawing Sheets

5,518,465

PLANETARY GEARTRAIN

BACKGROUND OF THE INVENTION

The present invention relates to a planetary geartrain used in automotive automatic transmissions.

A previously used planetary geartrain uses a multiplate brake assembly which connects a A member of the planetary geartrain to a reaction member in the forward first and reverse gear positions, and also uses a multiple clutch assembly which connects the A member to a input shaft in the direct drive and overdrive gear positions.

Because of the large capacity of the multiplate brake assembly which connects the A member to the reaction member, the previous type of automatic transmission has a drawback to create large amount of drag resistance when the multiplate brake assembly is released in the direct drive and overdrive gear positions and aggravates a fuel economy of automobile.

SUMMARY OF THE INVENTION

This invention is to eliminate the drawback, reduce the drag resistance and improve the fuel economy of automobiles with automatic transmission in the direct drive and overdrive gear positions by placing the multiplate clutch assembly and the dog clutch in series, then making selective connections of the A member to the reaction member or the input shaft.

It also provides a better layout of planetary gear to place the multiplate clutch assembly and the dog clutch in series, then make selective connections of the A member to the case or the input shaft.

BRIEF DESCRIPTION OF THE DRAWINGS

The invention is now described with reference to the accompanying drawings, wherein.

DETAILED DESCRIPTION OF THE INVENTION

Figure 1:
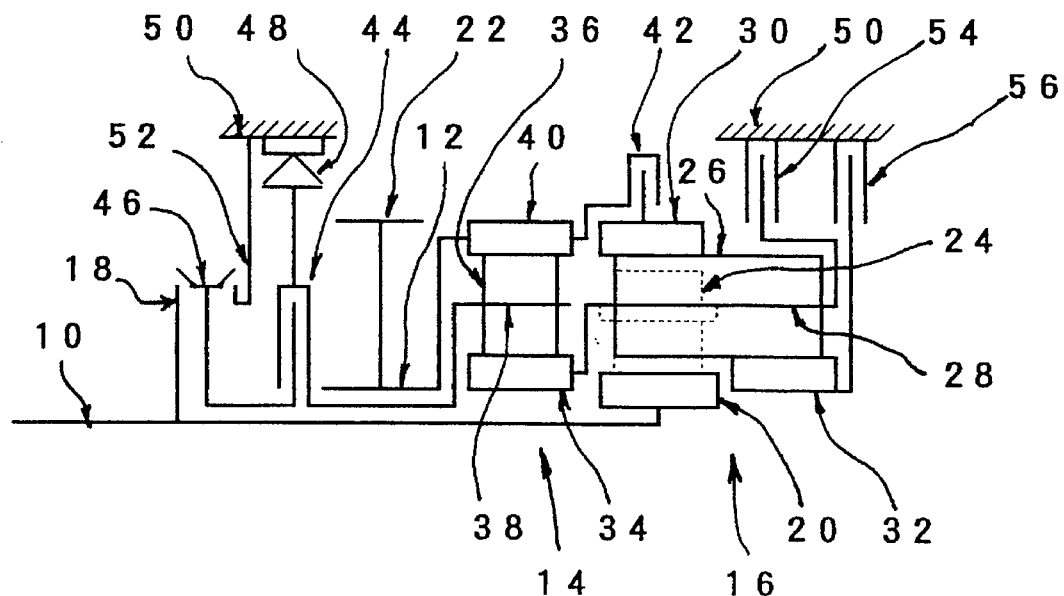
FIG. 1 is a view of skeleton drawing of forward six-speed planetary geartrain. It shows the A member fixed to the case in the forward first and reverse position is selectively connected to the case or the input shaft through series of the multiplate clutch assembly and the dog clutch.

In FIG. 1, the planetary geartrain is composed of the input shaft 10, the output shaft 12, a set of the simple planetary gear 14 and a set of the double pinion planetary gear 16.

The input shaft 10 is connected to the first clutch gear 18 and the second sun gear 20 of the double pinion planetary gear set 16.

The input shaft 10 is driven by torque converter (not shown on the drawing) which is usually driven by the engine.

The output shaft 12 and the output gear 22 are connected together as a piece.

The second sun gear 20 is meshed with the short pinion 24 of the double pinion planetary gear set 16, and the short pinion 24 is meshed with the long pinion 26.

The short pinion 24 and the long pinion 26 are supported by the second planet carrier 28.

The long pinion 26 is meshed with the second ring gear 30 and the third sun gear 32. The double pinion planetary gear is composed of the second sun gear 20, the short pinion 24, the long pinion 26 and the pinion supports such as the second planet carrier 28, the second ring gear 30 and the third sun gear 32.

The second planet carrier 28 is connected to the first sun gear 34 of the simple planetary gear set 14. The first sun gear 34 is meshed with the pinion 36 which is supported by the first carrier 38 and meshed with the first ring gear 40.

The simple planetary gear set 14 is composed of the first sun gear 34, the pinion 36, the first planet carrier 28 and the first ring gear 40.

The first ring gear 40 is connected to the output shaft 12 and also can be connected to the second ring gear 30 by the first clutch 42.

The first planet carrier 38 can be connected the dog clutch 46 by engaging the second clutch 44 and also can be connected only in one direction to the case 50 of reaction member by the over running clutch 48. The first planet carrier 38 is called, "A member".

The dog clutch 46 can be selectively meshed with the first clutch gear 18 or the second clutch gear 52. The second clutch gear 52 and the case 50 are connected together as a piece.

The second planet carrier 28 can be fixed to the case 50 by the first brake 54. The third sun gear 32 can be connected to the case 50 by engaging the second brake 56.

Regarding the planetary geartrain in FIG. 1, the gear ratios for the forward six speeds and the reverse one speed are provided by selectively meshing or engaging the first clutch 42, the second clutch 44, the dog clutch 46, the over running clutch 48, the first brake 54 and the second brake 56.

This is to have the fixed reduced gear ratio in the forward first position of the D range when accelerating by engaging the first clutch 42 when the first planet carrier 38 of the A member is connected to the case 50 by the over running clutch 48 only when accelerating.

In the forward second position, the fixed reduced gear ratio is provided by engaging the first clutch 42 and the first brake 456 which fixed the second planet carrier 28 to the case 50.

In the forward third position, the fixed reduced gear ratio is provided by releasing the first brake 54, engaging the first clutch 42 and the second brake 56 which fixed the third sun gear 32 to the case 50.

In the forward forth position, the first planet carrier 38 of the A member and the input shaft 10 are connected together as a piece by releasing the second brake 56 and engaging the first clutch 42, and also by meshing the dog clutch 46 with the first clutch gear 18, Then, by engaging the second clutch 44, as all the planetary gears are connected together as a set, the input shaft 10 and output shaft 12 are directly connected.

In the forward fifth position, the fixed increased gear ratio is provided by the engagement of the second clutch 44 which is the result of releasing the first clutch 42, the meshing the dog clutch 46 and the first clutch gear 18 the same as in above forth position, and also by fixing the third sun gear 32 to the case 50 by engaging the second brake 56.

In the forward six position, the fixed increased gear ratio is provided by the engagement of the second clutch 44 which is the result of meshing the dog clutch 46 and the first clutch gear 18 the same as in above fifth position, and by fixing the second sun gear 34 to the case 50 which is the result of releasing the second brake 56 and engaging the first brake 54.

In the reverse position, the fixed reduced gear ratio for reverse is provided by meshing the dog clutch 46 and the second clutch gear 52, then fixing the first planet carrier 38 of the A member to the case 50 with the engagement of the second clutch 44, and by fixing the third sun gear 32 to the case 50 with the engagement of the second brake 56.

In the forward first position in L range, the fixed reduced gear ratio for both acceleration and deceleration are provided by meshing the dog clutch 46 and the second clutch gear 52, then fixing the first carrier 38 of the A member to the case 50 with the engagement of the second clutch 44, and by engaging the first clutch 42.

A previously known planetary geartrain is composed of a multiplate brake assembly which fixed the A member to the case of the reaction member in the first forward and the reverse positions, and of a multiplate clutch assembly which connects the A member to the input shaft in the direct drive and the overdrive positions.

However, the multiplate brake assembly which fixes the A member to the case has to have very large capacity, since the brake assembly connected to the case receives large force in the reverse position. This large brake assembly when not running creates large drag resistance in the high speed cruising such as in the forth or higher positions and decreases the fuel economy of automobiles.

This invention is to enable the A member to be selectively connected to the case or the input shaft through series of the multiplate clutch assembly and the dog clutch.

In the D range for normal cruising, the dog clutch is meshed with the input shaft and the A member is connected to the input shaft by engaging the clutch.

In the forward first position of the D range in the accelerating direction, it is not necessary to fix the A member to the case by the dog clutch and the multiplate clutch assembly, since the A member is automatically fixed to the case by the over running clutch.

Only the time it is necessary to fix the A member to the case by meshing the dog clutch with the case is when in the forward first position of the L range and the reverse position of the R range. In this case, the A member is fixed to the case by engaging the second clutch.

It means that the A member is to be selectively connected to the input shaft or the case by the dog clutch.

Therefore, in the D range, the multiplate brake assembly which previously fixed the A member to the case is no longer exist. That means the reduction of drag resistance caused by the brake assembly and the improvement of the fuel economy especially in high speed cruising.

As explained above, it is technically simple to control the dog clutch, since the dog clutch is meshed to the case only when in the L range and the reverse position. In the D range, the dog clutch is connected only to the input shaft.

Figure 2:
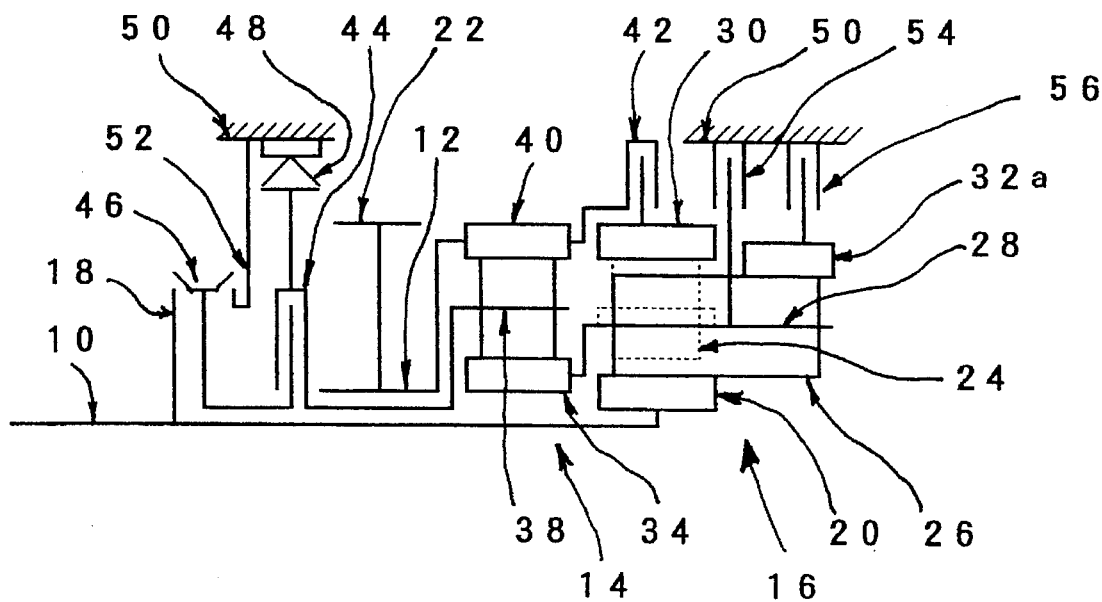
FIG. 2 is a view of the second skeleton drawing of forward six-speed planetary geartrain. It shows the A member is selectively connected to the case or the input shaft through series of the multiplate clutch assembly and the dog clutch.

The planetary geartrain shown in FIG. 2 has a different composition of a double pinion planetary gear set from ones in FIG. 1.

The second sun gear 20 is meshed with the long pinion 26 which is meshed with the short pinion 24 and the third ring gear 32*a*. The short pinion 24 is meshed with the second ring gear 30. The third ring gear 32*a* can be fixed to the case 50 by the second brake 56.

The other compositions are the same as ones in FIG. 1. That is to say the third sun gear 32 in FIG. 1 is replaced by the third ring gear 32*a* in FIG. 2.

In FIG. 2, it is the same combination of the clutch and the brake to have each increased and reduced gear ratio as one in FIG. 1.

Figure 3:
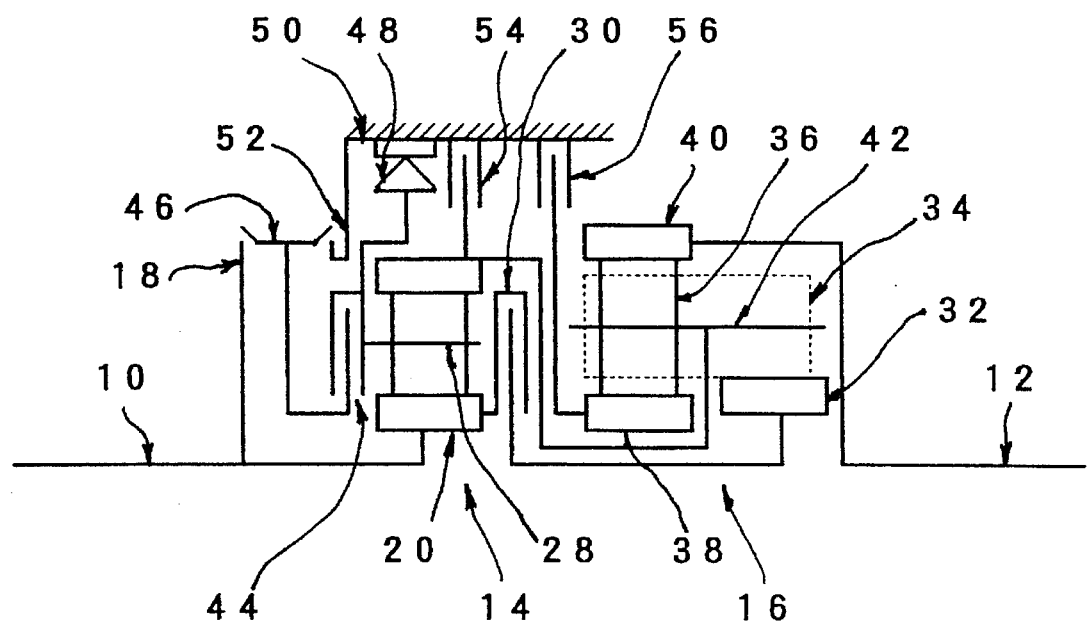
FIG. 3 is a view of the third skeleton drawing of forward five-speed planetary geartrain. It shows the A member is selectively connected to the case or the input shaft through series of the multiplate clutch assembly and the dog clutch.

In FIG. 3, the planetary geartrain is composed of the input shaft 10, the output shaft 12, a simple planetary gear set 14 and the double pinion planetary gear set 16.

The input shaft 10 is connected to the first clutch gear 18 and the first sun gear 20 of the simple planetary gear set 14. The input shaft 10 is driven by the torque converter which is usually driven by the engine not shown.

The first sun gear 20 is meshed with the pinion 22 which is meshed with the ring gear 24. The pinion 22 is supported by the first planet carrier 28.

The simple planetary gear set 14 is composed of the first sun gear 20, the pinion 22, the first planet carrier 28 and the first ring gear 24.

The first sun gear 20 can be connected to the third sun gear 32 by the first clutch 30.

The third sun gear 32 is meshed with the long pinion 34 which is meshed with the short pinion 36. The short pinion 36 is meshed with the second sun gear 38 and the second ring gear 40. The long pinion 34 and the short pinion 36 are supported by the second planet carrier 42.

The double pinion planetary gear set 16 is composed of the second sun gear 38, the short pinion 36, the long pinion 34, the second planet carrier 42, the third sun gear 32 and the second ring gear 40.

The first planet carrier 28 can be connected to the dog clutch 46 by the second clutch 44 and also to the case 50 of the reaction member in one direction by the over running clutch 48. The first planet carrier 28 is the A member.

The dog clutch 46 can be meshed selectively with the first clutch gear 18 or the second clutch gear 52. The second clutch gear 52 is connected to the case 50.

The first ring gear 24 is connected to the second planet carrier 42 and can be fixed to the case 50 by the first brake 54.

The second sun gear 38 can be fixed to the case 50 by the second brake 56.

Regarding the planetary geartrain in FIG. 3, the gear ratio for the forward five speeds and the reverse one speed are provided by selectively meshing or engaging the first clutch 30, the second clutch 44, the dog clutch 46, the over running clutch 48, the first brake 54 and the second brake 56.

That is to say the fixed reduced gear ratio in the accelerating direction is provided by engaging the first clutch 30 when the first planet carrier 28 of the A member in the forward first position of the D range when accelerating is fixed to the case 50 by engaging the first clutch 48 and only in the accelerating direction.

In the forward second position, the fixed reduced gear ratio is provided when the second planet carrier 42 is fixed to the case 50 by engaging the first clutch 30 and also by engaging the first brake 54.

In the forward third position, the fixed reduced gear ratio is provided when the second sun gear 38 is fixed to the case 50 by relersing the first brake 54, engaging the first clutch 30 and also by engaging the second brake 56.

In the forward forth position, the input shaft 10 and the output shaft 12 are directly connected when all the planetary gears are connected together by releasing the second brake 56, engaging the first clutch 30, meshing the dog clutch 46 with the first clutch gear 18 which has the first planet carrier 38 of the A member connected to the input shaft 10, and also by engaging the second clutch 44.

In the forward fifth position, the increased gear ratio is provided when the second clutch 44 is engaged by meshing the dog clutch 467 with the first clutch gear 18 and fixing the second sun gear 38 to the case 50 by releasing the first clutch 30 and engaging the second brake 56.

In the reverse position, the reverse fixed reduced gear ratio is provided when the first planet carrier 28 of the A member is fixed to the case 50 by meshing the dog clutch 46 with the second clutch gear 52 and engaging the second clutch 44, also when the second sun gear 38 is fixed to the case 50 by engaging the first brake 56.

In the forward first position of the L range, the fixed reduced gear ratio in both accelerating and decelerating directions is provided when the first carrier 28 of the A member is fixed to the case 50 by meshing the dog clutch 46 with the second clutch gear 52 and engaging the second clutch 44, then engaging the first clutch 30.

In this example, above A member can be selectively connected to the case or the input shaft through series of the multiplate clutch assembly and the dog clutch.

Therefore, as FIG. 1, the multiplate brake assembly which fixed the A member to the case is no longer necessary in the D range. That eliminates the drag resistance and improves the fuel economy especially in the high speed cruising.

This invention is not only effective in the illustrated examples, but also in the other planetary geartrains. For example, in a planetary geartrain which uses the same A member fixed to the case in the forward first and the reverse positions or to the input shaft in the over drive position, the present invention provides an operation to have the A member selectively connected to the case or the input shaft through series of the multiplate clutch assembly and the dog clutch.

Accordingly, it should be understood that we intend to cover by the appended claims all modifications falling the true spirit and scope of our invention.

What is claimed is:

1. A planetary geartrain comprising sets of planetary gears and friction elements wherein a A member, fixed to a case in a forward first and the reverse gear, is connected selectively to the case or an input shaft through a series of a multiplate clutch assembly and a dog clutch.

2. A planetary geartrain as defined in claim 1, comprising a first planetary gear set which is a simple planetary gear and a second planetary gear set which is a double pinion type, a first ring gear of the first planetary gear set meshed with a pinion which is supported by a first planet carrier and meshed with a first sun gear, a long pinion of the second planetary gear set meshed with a second ring gear and a third sun gear and a short pinion, the short pinion meshed with a second sun gear, the long pinion and the short pinion supported by a second carrier and the first sun gear of the first planetary gear set connected to the second planet carrier, wherein the first sun gear and the second planet carrier are fixed to a case by a first brake, the first ring gear connected to an output shaft, wherein the first ring gear is connected to the second ring gear, the second sun gear connected to an input shaft, wherein the third sun gear is fixed to the case and the first carrier of a A member is connected selectively to the case or the input shaft.

3. A planetary geartrain as defined in claim 1, comprising a first planetary gear set which is a simple planetary gear and a second planetary gear set which is a double pinion type, a first ring gear of the first planetary gear set meshed with a pinion which is supported by a first carrier and meshed with a first sun gear, a second ring gear of the second planetary gear set meshed with a short pinion, the short pinion meshed with a long pinon which meshed with a second sun gear and a third ring gear, the first sun gear connected to a second planet carrier, wherein the connected first sun gear and the second planet carrier are fixed to a case by a second brake, the first ring gear connected to an output shaft, wherein the first ring gear is connected the second ring gear, the second sun gear connected to an input shaft, wherein a third ring gear is fixed to the case and the first planet carrier of a member is connected selectively to the case or the input shaft.

4. A planetary geartrain as defined in claim 1, comprising first planetary gear set which is a simple planetary gear and a second planetary gear set which is a double pinion type, a first ring gear of the first planetary gear set meshed with a pinion which is supported by a first planet carrier and meshed with a first sun gear, a second ring gear of the second planetary gear set meshed with a short pinion which is meshed with a second sun gear and a long pinion, the short pinion and the long pinion been supported by a second planet carrier, the long pinion meshed with a third sun gear, the first ring gear connected to the second planet carrier, wherein the connected first ring gear and the second planet carrier are fixed to a case by a first brake, the second ring gear connected to a output shaft, the first sun gear connected to a input shaft, wherein the first sun gear is connected to the third sun gear by a first clutch, wherein the second sun gear is fixed to the case by a second brake and the first planet carrier of a A member is connected selectively to the case or the input shaft.

* * * * *